(12) United States Patent
Candelore

(10) Patent No.: US 11,729,456 B2
(45) Date of Patent: *Aug. 15, 2023

(54) LONG DURATION ERROR CORRECTION WITH FAST CHANNEL CHANGE FOR ATSC 3.0 REAL-TIME BROADCAST MOBILE APPLICATION

(71) Applicant: Sony Group Corporation, Tokyo (JP)

(72) Inventor: Brant Candelore, Poway, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/687,660

(22) Filed: Mar. 6, 2022

(65) Prior Publication Data

US 2022/0217437 A1 Jul. 7, 2022

Related U.S. Application Data

(62) Division of application No. 17/141,155, filed on Jan. 4, 2021, now Pat. No. 11,303,954.

(51) Int. Cl.
*H04N 21/435* (2011.01)
*H04N 21/235* (2011.01)
*H04N 21/426* (2011.01)

(52) U.S. Cl.
CPC ......... *H04N 21/435* (2013.01); *H04N 21/235* (2013.01); *H04N 21/426* (2013.01)

(58) Field of Classification Search
CPC ... H04N 21/435; H04N 21/235; H04N 21/426
See application file for complete search history.

(56) References Cited

U.S. PATENT DOCUMENTS

| | | | |
|---|---|---|---|
| 4,169,226 A | 9/1979 | Fukuji | |
| 4,804,972 A | 2/1989 | Schudel | |
| 5,528,253 A | 6/1996 | Franklin | |
| 6,023,242 A | 2/2000 | Dixon | |
| 6,072,440 A | 6/2000 | Bowman | |
| 6,538,612 B1 | 3/2003 | King | |
| 6,710,749 B2 | 3/2004 | King | |
| 6,832,070 B1 | 12/2004 | Perry et al. | |
| 6,864,846 B2 | 3/2005 | King | |
| 6,904,609 B1 | 6/2005 | Pietraszak et al. | |
| 6,937,199 B2 | 8/2005 | King | |
| 7,075,492 B1 | 7/2006 | Chen et al. | |
| 7,076,202 B1 | 7/2006 | Billmaier | |

(Continued)

FOREIGN PATENT DOCUMENTS

| EP | 3108639 B1 | 4/2018 |
|---|---|---|
| KR | 20080000868 A | 1/2008 |

OTHER PUBLICATIONS

Ansfield et al., "Measuring ATSC 3 RF Environment Using Autonomous Vehicle", related U.S. Appl. No. 17/494,804, Applicant's response to Non-Final Office Action filed Jun. 23, 2022.

(Continued)

*Primary Examiner* — Kyu Chae
(74) *Attorney, Agent, or Firm* — John L. Rogitz

(57) ABSTRACT

Techniques are described for using the Advanced Television Systems Committee (ATSC) 3.0 television protocol in robustly delivering TV programming to mobile receivers while ensuring error correction.

20 Claims, 7 Drawing Sheets

(56) References Cited

U.S. PATENT DOCUMENTS

| | | |
|---|---|---|
| 7,239,274 B2 | 7/2007 | Lee et al. |
| 7,301,505 B2 | 11/2007 | King |
| 7,472,409 B1 | 12/2008 | Linton |
| 7,484,233 B2 | 1/2009 | Pietraszak et al. |
| 7,603,687 B2 | 10/2009 | Pietraszak et al. |
| 7,679,573 B2 | 3/2010 | Shuster et al. |
| 7,685,621 B2 | 3/2010 | Matsuo |
| 8,077,113 B2 | 12/2011 | Syed et al. |
| 8,269,901 B2 | 9/2012 | Yi et al. |
| 8,368,611 B2 | 2/2013 | King et al. |
| 9,432,869 B2 | 8/2016 | Dillinger et al. |
| 9,577,682 B2 | 2/2017 | Rozenberg |
| 11,303,954 B1* | 4/2022 | Candelore .......... H04N 21/6131 |
| 2003/0051246 A1 | 3/2003 | Wilder et al. |
| 2003/0214449 A1 | 11/2003 | King |
| 2004/0128689 A1 | 7/2004 | Pugel et al. |
| 2004/0160375 A1 | 8/2004 | King |
| 2004/0227655 A1 | 11/2004 | King |
| 2005/0108751 A1 | 5/2005 | DaCosta |
| 2005/0193415 A1 | 9/2005 | Ikeda |
| 2005/0225495 A1 | 10/2005 | King |
| 2006/0020978 A1 | 1/2006 | Miyagawa |
| 2006/0139499 A1 | 6/2006 | Onomatsu et al. |
| 2006/0170603 A1 | 8/2006 | King |
| 2006/0187117 A1 | 8/2006 | Lee et al. |
| 2007/0152897 A1 | 7/2007 | Zimmerman et al. |
| 2008/0129885 A1 | 6/2008 | Yi et al. |
| 2008/0136722 A1 | 6/2008 | King |
| 2008/0186242 A1 | 8/2008 | Shuster et al. |
| 2008/0186409 A1 | 8/2008 | Kang et al. |
| 2008/0246677 A1 | 10/2008 | Shuster et al. |
| 2009/0135309 A1 | 5/2009 | DeGeorge et al. |
| 2009/0260038 A1 | 10/2009 | Acton et al. |
| 2009/0288127 A1* | 11/2009 | Corson .............. H04N 21/4788 725/110 |
| 2009/0310030 A1 | 12/2009 | Litwin et al. |
| 2010/0104024 A1 | 4/2010 | Sullivan et al. |
| 2010/0214482 A1 | 8/2010 | Kang |
| 2010/0315307 A1 | 12/2010 | Syed et al. |
| 2011/0060669 A1* | 3/2011 | Laves .................. H04L 65/611 380/255 |
| 2011/0126232 A1 | 5/2011 | Lee et al. |
| 2012/0230651 A1* | 9/2012 | Chen ...................... H04N 5/782 386/292 |
| 2013/0207868 A1 | 8/2013 | Venghaus et al. |
| 2015/0161236 A1 | 6/2015 | Beaumont et al. |
| 2015/0161249 A1 | 6/2015 | Knox et al. |
| 2015/0382217 A1 | 12/2015 | Odio Vivi et al. |
| 2016/0088498 A1 | 3/2016 | Sharawi |
| 2016/0173945 A1 | 6/2016 | Oh et al. |
| 2017/0163703 A1* | 6/2017 | Cui ........................ H04L 65/70 |
| 2017/0317408 A1 | 11/2017 | Hamada et al. |
| 2018/0120169 A1 | 5/2018 | Jackson et al. |
| 2019/0037418 A1 | 1/2019 | Gunasekara et al. |
| 2019/0079659 A1 | 3/2019 | Adenwala et al. |
| 2019/0199770 A1* | 6/2019 | Dasher ............... H04N 21/6543 |
| 2019/0335221 A1 | 10/2019 | Walker et al. |
| 2020/0037219 A1 | 1/2020 | Kumar et al. |
| 2020/0297955 A1 | 9/2020 | Shouldice |
| 2020/0305003 A1 | 9/2020 | Landa et al. |
| 2020/0305031 A1* | 9/2020 | Lee .................... H04W 36/0085 |
| 2020/0322656 A1 | 10/2020 | Reitmeier |
| 2020/0389196 A1 | 12/2020 | Choi et al. |
| 2021/0136446 A1* | 5/2021 | Greene ............. H04N 21/4263 |
| 2021/0136624 A1* | 5/2021 | Shih .................. H04W 28/0278 |

OTHER PUBLICATIONS

Ansfield et al., "Measuring ATSC 3 RF Environment Using Autonomous Vehicle", related U.S. Appl. No. 17/494,804, Non-Final Office Action dated Jun. 20, 2022.

* cited by examiner

LONG DURATION ERROR CORRECTION WITH FAST CHANNEL CHANGE FOR ATSC 3.0 REAL-TIME BROADCAST MOBILE APPLICATION

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in ATSC A/300 for delivering the next generation of broadcast television. ATSC 3.0 supports delivery of a wide range of television services including, but not limited to, televised video, interactive services, non-real time delivery of data, and tailored advertising to a large number of receiving devices, from ultra-high-definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

As understood herein, reception by a mobile receiver of ATSC 3.0 signals can be impaired by loss or attenuation of signal due to overpasses, tunnels, mountains, and tall buildings. Loss of signal could be many minutes long. Furthermore, while ATSC 3.0 provides error-correction as part of the modulation scheme to overcome many perceived impairments to the signal if the signal is lost for more than a second or two there can be a complete loss of image.

As further recognized herein, memory and processing power is becoming cheaper every day. Accordingly, present principles exploit an infrastructure that allows a receiving device, e.g., a mobile TV, to request packets from the broadcaster to replace missing or damaged packets in a large (10-15 minutes) buffer of the receiver. The replacement packets may be received from a back channel such as a cellular phone system such as 5G or 4G, or the back channel may be Wi-Fi when available.

To address channel change latency owing to use of a large buffer, multiple channels in the same multiplex as the currently tuned-to channel may be buffered for immediate tuning responsive to a channel change. Or multiple channels in a different multiplex (received through a secondary tuner) can be buffered. Multiple antennas may be employed to permit tuning to and buffering multiple different signals (instead of the same exact signal) to perform a rapid channel change function that is error-free.

Accordingly, a digital television (TV) system includes at least one mobile receiver that in turn includes at least one processor programmed with instructions to receive a first digital TV broadcast stream. The instructions are executable to store, in at least one buffer, at least one period of the first stream prior to presenting the first stream. Furthermore, the instructions are executable to identify at least one packet discrepancy in the first stream, and to request, from at least one back channel source, data to cure the packet discrepancy. The instructions are executable to receive the data from the back-channel source, insert the data into the buffer to cure the packet discrepancy, and play the first stream from the buffer.

In example embodiments the back-channel source includes at least one wireless telephony network and/or at least one Wi-Fi source.

In some embodiments the packet discrepancy includes a missing packet and/or a damaged packet.

In non-limiting examples the instructions may be executable to, simultaneously with buffering the first stream, buffer at least a second stream. The second stream may be received in a multiplex containing the first stream, or the first stream may be received at a first tuner of the mobile receiver and the second stream may be received at a second tuner of the mobile receiver.

In some examples the instructions can executable to receive a channel change command to present a new channel. In these examples the instructions can be executable to, responsive to the channel change command, determine whether packets associated with the new channel are in the buffer, and responsive to determining that packets associated with the new channel are in the buffer, immediately access the packets associated with the new channel from the buffer and present the new channel. The instructions may be executable to, responsive to determining that packets associated with the new channel are not in the buffer, begin to buffer, for a second period shorter than the first period, packets of the new channel. The instructions can be executable to present the new channel.

Further, in these last examples the instructions can be executable to determine whether to add the new channel to a set of streams to be buffered for the first period, and responsive to identifying that the new channel should be added to the set of streams to be buffered for the first period, add the new channel to the set.

In non-limiting embodiments the instructions are executable to identify at least one outage period associated with at least one route. The outage period can be a period during which broadcast digital TV is not receivable. The instructions may be executable to establish the first period based at least in part on the outage period.

In non-limiting embodiments the instructions may be executable to receive a command to stop presenting digital TV on the mobile receiver. Responsive to the command to stop presenting, the instructions can be executed to continue to buffer at least one digital TV stream in the buffer. The instructions may be executable to, responsive to a command to commence playing digital TV on the mobile receiver, identify whether packets associated with a stream to be played are in the buffer, and responsive to determining that packets associated with the stream to be played are not in the buffer, begin to buffer, for a second period shorter than the first period, packets of the stream to be played. The instructions can be further executable to play the stream to be played from the buffer, create a duplicate buffer of the stream to be played with a period longer than the second period, and selectively switch to playing packets in the duplicate buffer.

In another aspect, an assembly includes at least one mobile receiver of digital television, at least one digital television over-the-air (OTA) source of wireless digital TV signals receivable from the OTA source by the mobile receiver, and at least one back channel source of wireless digital TV replacement content receivable from the back-channel source by the mobile receiver. The back-channel source includes at least one wireless telephony network or at least one Wi-Fi source or both a wireless telephony network and a Wi-Fi source.

In another aspect, a method includes broadcasting digital TV signals to at least one mobile receiver and sending replacement packets for defective or lost packets in the digital TV signals to the mobile receiver from a cellular telephony network or a Wi-Fi source.

The details of the present application, both as to its structure and operation, can best be understood in reference to the accompanying drawings, in which like reference numerals refer to like parts, and in which:

DETAILED DESCRIPTION

Figure 1:
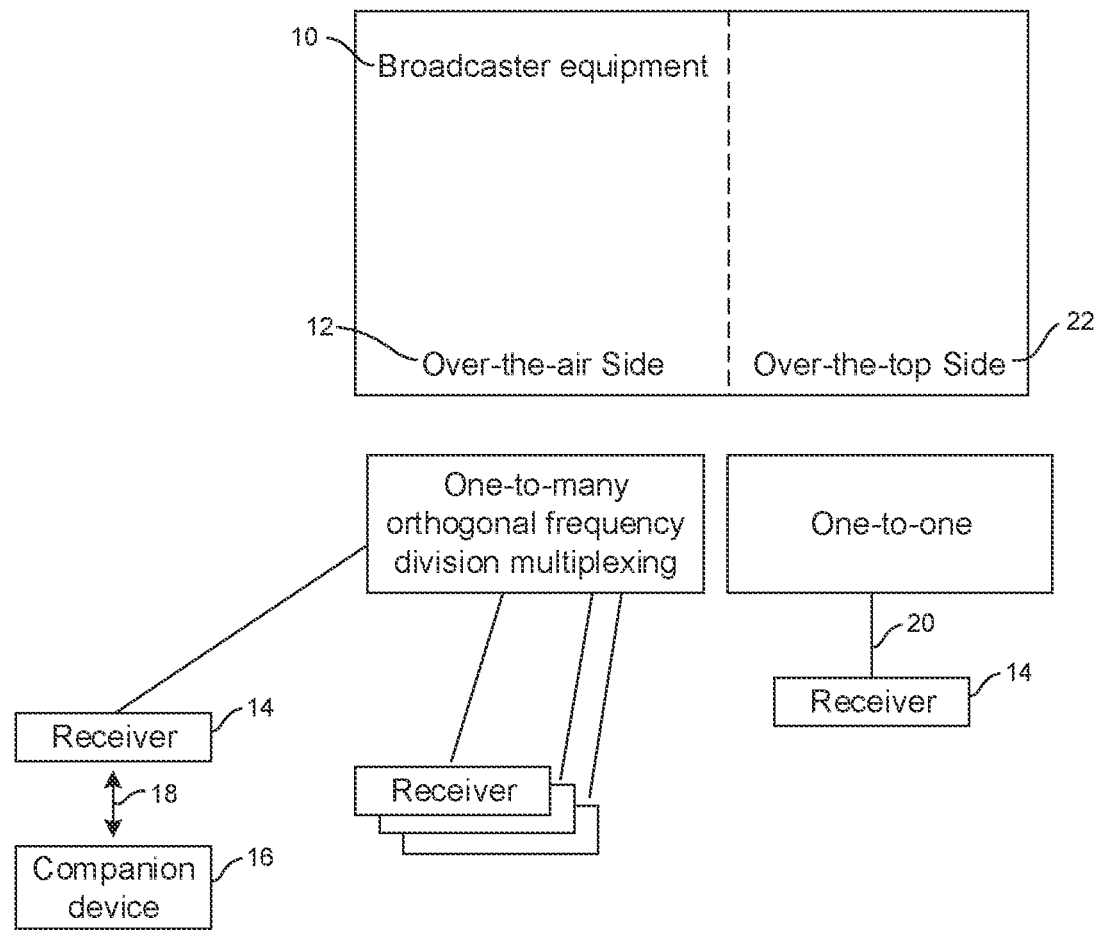
FIG. 1 is a block diagram of an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
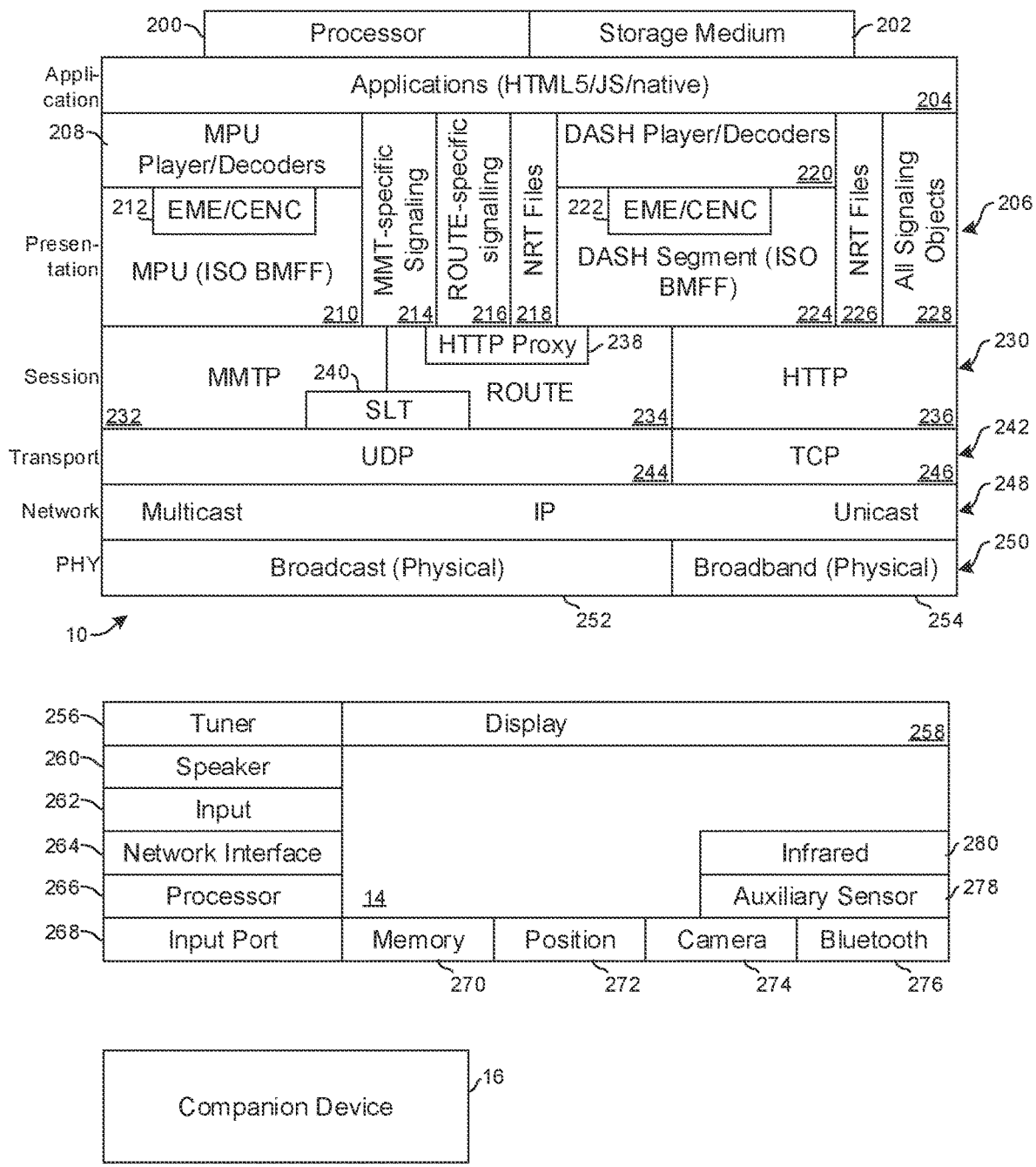
FIG. 2 is a block diagram showing components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements. Audio video (AV) streams are contained in ROUTE sessions. Layered coding transport (LCT) channels are setup within a ROUTE session. Each LCT channel carries either video or audio or captions or other data.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses user datagram protocol (UDP) 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile formatted data sent through the various protocols (HTTP/TCP/IP) in the protocol stack may be used on the broadband side. Media files in the DASH-IF profile formatted data based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g., communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high-definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g., receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g., all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

Figure 3:
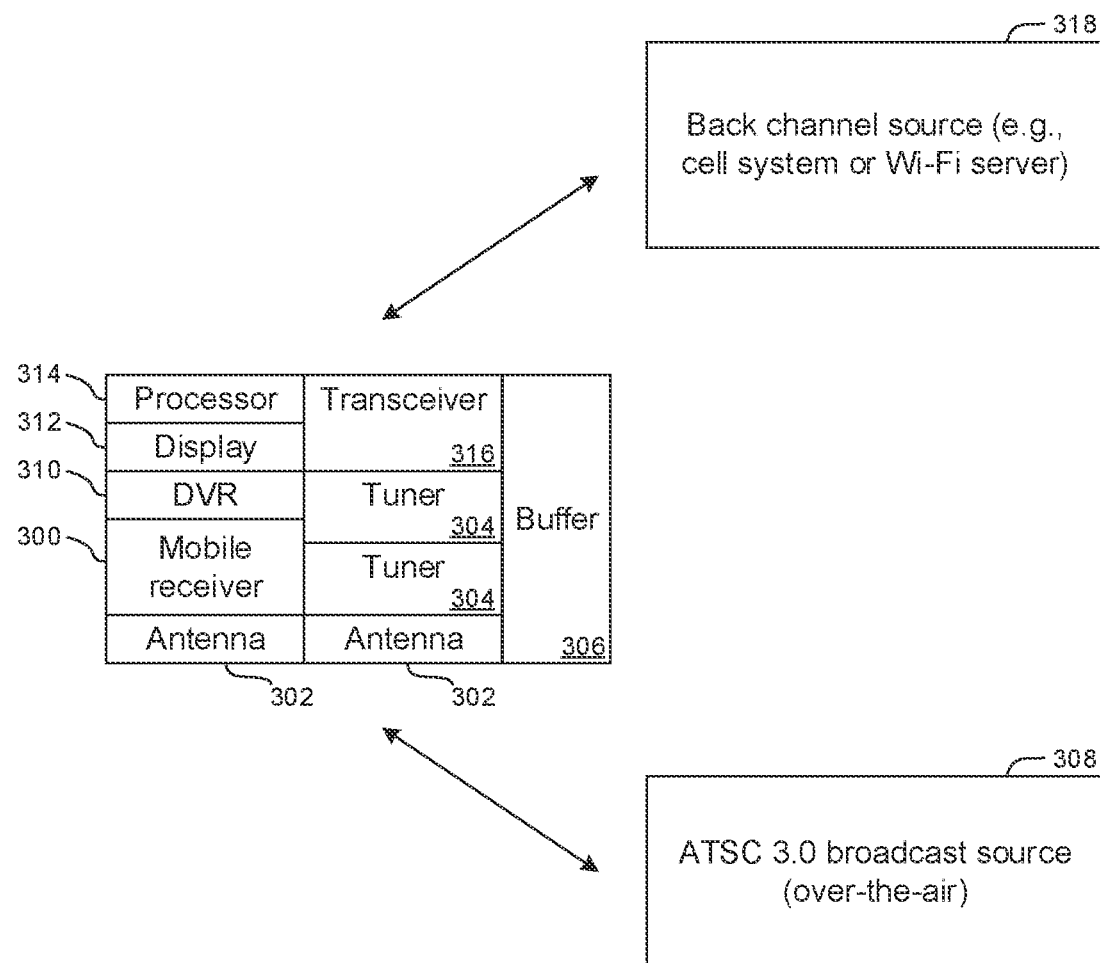
FIG. 3 illustrates an example assembly with a mobile receiver, OTA ATSC 3.0 source, and back channel source of corrected packets.

FIG. 3 illustrates that a mobile ATSC 3.0 receiver 300 may include any of the receiver components described herein, and in the specific example shown includes one or more antennas 302 (two shown for example) receiving signals and providing the signals to one or more tuners 304 (two shown for example) that can process the signals to buffer packets carried in the signals in one or more content buffers 306. The signals may be received wirelessly from an ATSC 3.0 broadcast (OTA) source 308. The buffer 306 may be part of a digital video recorder (DVR) 310 of the mobile receiver 300 or of the vehicle in which the mobile receiver 300 is located. Buffered signals may be presented on a display 312 of the mobile receiver 300 under control of one or more processors 314.

Additionally, the mobile receiver 300 may include one or more out-of-band transceivers 316 for wirelessly communicating with one or more back channel sources 318 of ATSC 3.0 packets. The back-channel source 318 may include, e.g., one or more wireless telephony networks such as but not limited one or more global system for mobiles (GSM)

networks or code division multiple access (CDMA) networks. The back-channel source 318 may include, e.g., one or more Wi-Fi servers.

Figure 4:
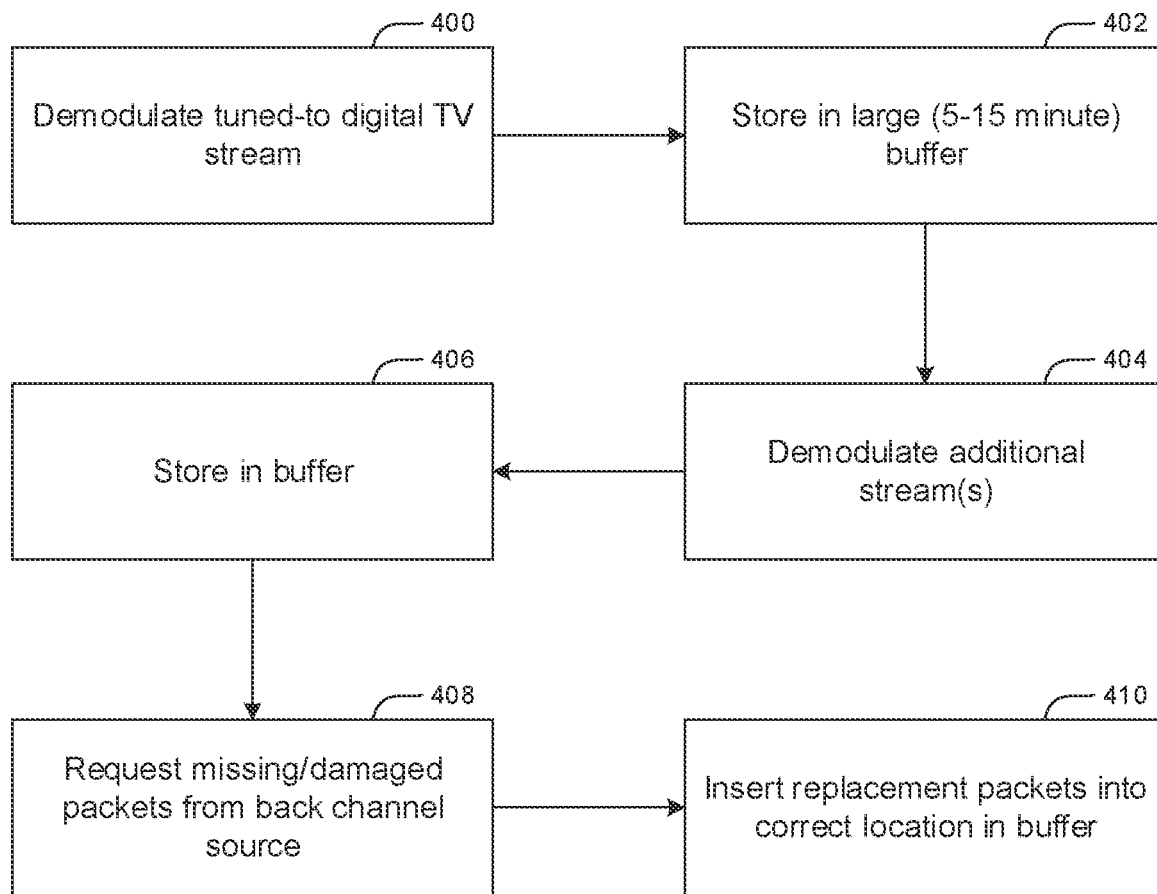
FIGS. 4 and 5 illustrate example logic in example flow chart format for buffering and error correction executed by the mobile receiver.

FIG. 4 illustrates logic that may be executed by the mobile receiver 300 shown in FIG. 3. Commencing at block 400, a tuned-to digital TV is demodulated by a tuner 304 and packets of the stream are stored in the buffer 306 at block 402. The buffer 306 is relatively large, e.g., it can hold several minutes (for instance, five minutes, or ten minutes, or twenty minutes of one or more streams, by way of non-limiting example).

Additionally, at block 404 the receiver 300 also demodulates one or more additional digital TV streams, buffering their packets in the buffer at block 406. These streams may be received in the same multiplex from the same tuner 304 that the tuned-to stream is receiver from, or from another tuner 304 (which may receive wireless signals from a different antenna 302 than the tuned-to stream is received from).

To address error correction in mobile digital TV applications and to create a premium service, at block 408 the mobile receiver 300 requests of the back-channel source 318 any missing packets or packets with errors, recognizing that ATSC 3.0 uses IP packets, using the transceiver 316 shown in FIG. 3. At block 410, replacement packets received from the back-channel source 318 are inserted into the locations in the buffer corresponding to missing or damaged packets. These steps may be executed for all streams in the buffer 306.

Figure 5:
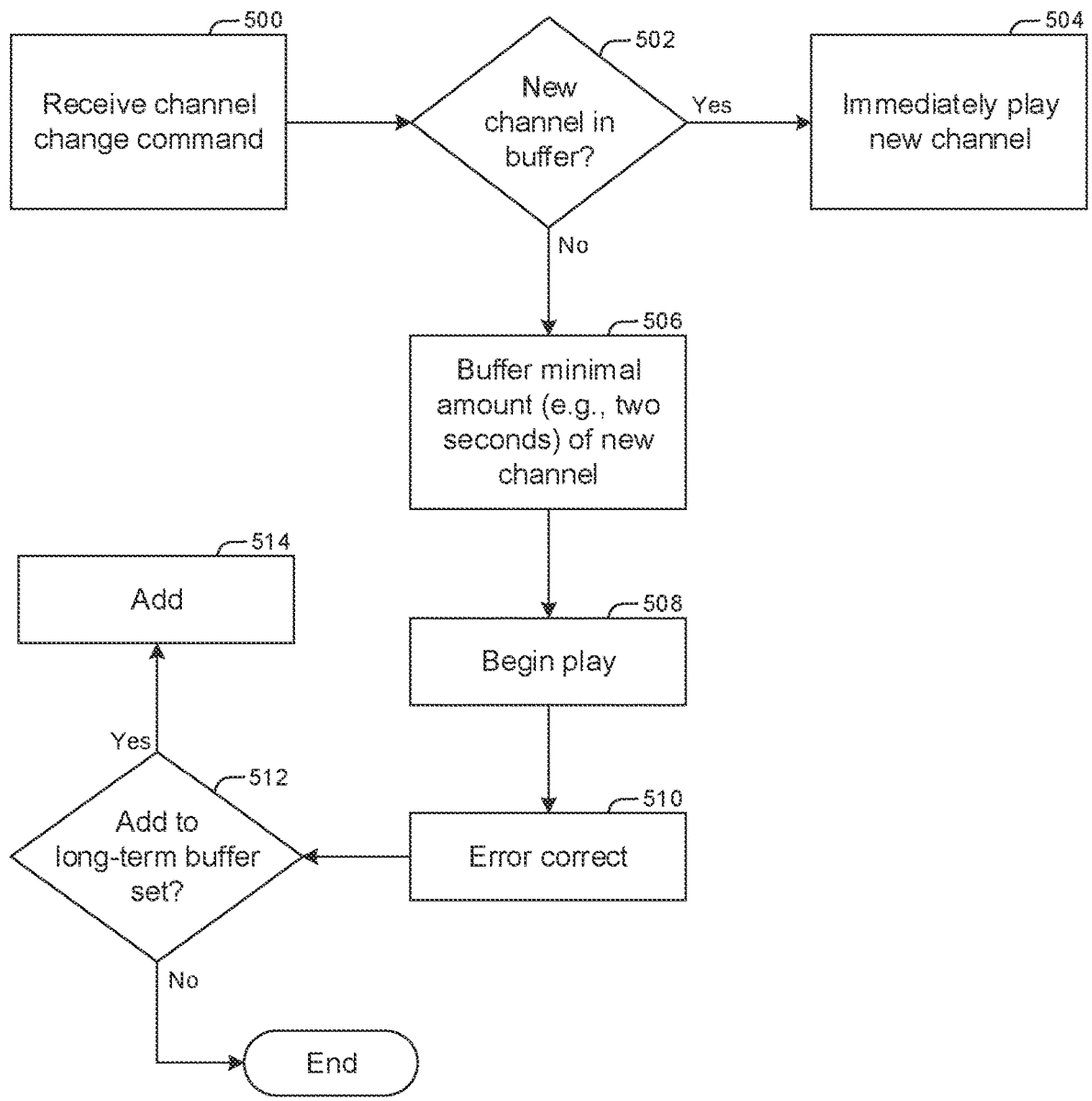

FIG. 5 illustrates that to address channel change latency owing to use of a large buffer 306, at block 500 a channel change command is received to present a new channel in lieu of what had been the currently tuned-to channel. Moving to decision diamond 502, it is determined whether the new stream packets corresponding to the new channel have been stored in the buffer. If so, packets of the new stream are immediately accessed from the buffer, decoded, and presented on the display 312 immediately with minimal perceptible latency. The content in this new stream buffer can also be assumed to be error corrected from FIG. 4.

On the other hand, if, at decision diamond 502, it is determined that the new stream chosen at block 500 is not one which was anticipated by pre-storage in the buffer, the logic flows from diamond 502 to block 506 to buffer an initial, small amount of the new stream (for instance, two seconds) that is sufficient to begin play, and then play is commenced of the new stream at block 508 after this short buffer period. Error correction for the new stream is executed at block 510 according to the logic of FIG. 4.

Moving to decision diamond 512, it is determined whether to add the new stream to the set of streams that are buffered long-term (e.g., for several minutes) in the future. For example, if the new stream has been tuned to a threshold number of times or for a threshold period, it may be added or may replace another stream in the set of buffered streams at block 514.

Figure 6:
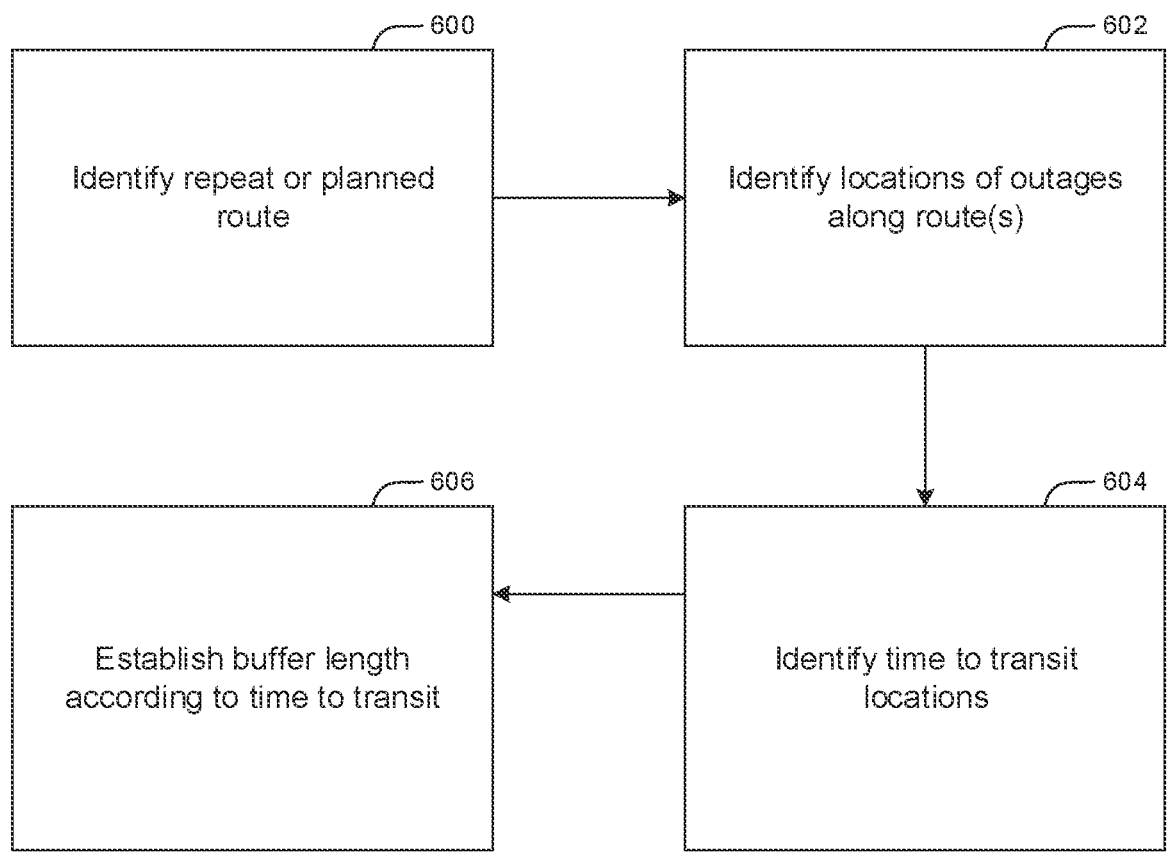
FIG. 6 illustrates example logic in example flow chart format for dynamically establishing buffer size based on expected outage areas along a route.

FIG. 6 recognizes that some transportation routes might have known outages, such as a tunnel that typically takes fifteen minutes to traverse or other natural or man-made obstruction of digital TV broadcast signals. Accordingly, at block 600 a planned, current, or repeat route may be identified. This may be done by establishing a wireless connection between the mobile receiver 300 and a user's cell phone navigation application, for example, or by other means, identifying from the application common routes, planned routes, or current routes. Moving to block 602, locations along the route(s) are identified at which digital TV broadcast may not be receivable, such as tunnels. This may be done by accessing an electronic route containing the route and indicating tunnels and the like.

Proceeding to block 604, the tie to transit the location(s) identified at block 602 is identified. This may be done by using current speed as indicated by, e.g., global positioning satellite (GPS) or by accessing an electronic map of the route that indicates typical speed through the location(s) or by other means. Block 606 indicates that the length of streams buffered in the buffer 306 may be set according to the time(s) to transit, e.g., the buffer length may be set to be approximately equal to the longest transit time identified at block 604.

Thus, the mobile receiver 300 can access mapping software (for example, executed in a vehicle and communicated to the mobile receiver via Bluetooth) that is aware of a destination and route and can calculate the longest outage, e.g., a particular tunnel that is a particular length and knowing the average rate travel (or real-time updates as to traffic speed)+some margin). The length of the buffer 306 may be dynamically established to be just that size. The particular route thus affects the buffer size chosen when starting off on a trip to minimize the buffer to just what is needed and also minimize the need to pre-cache a buffer while the receiver/player is "off". In that scenario, the user might have to wait a several minutes for a buffer to fill before content is rendered.

Figure 7:
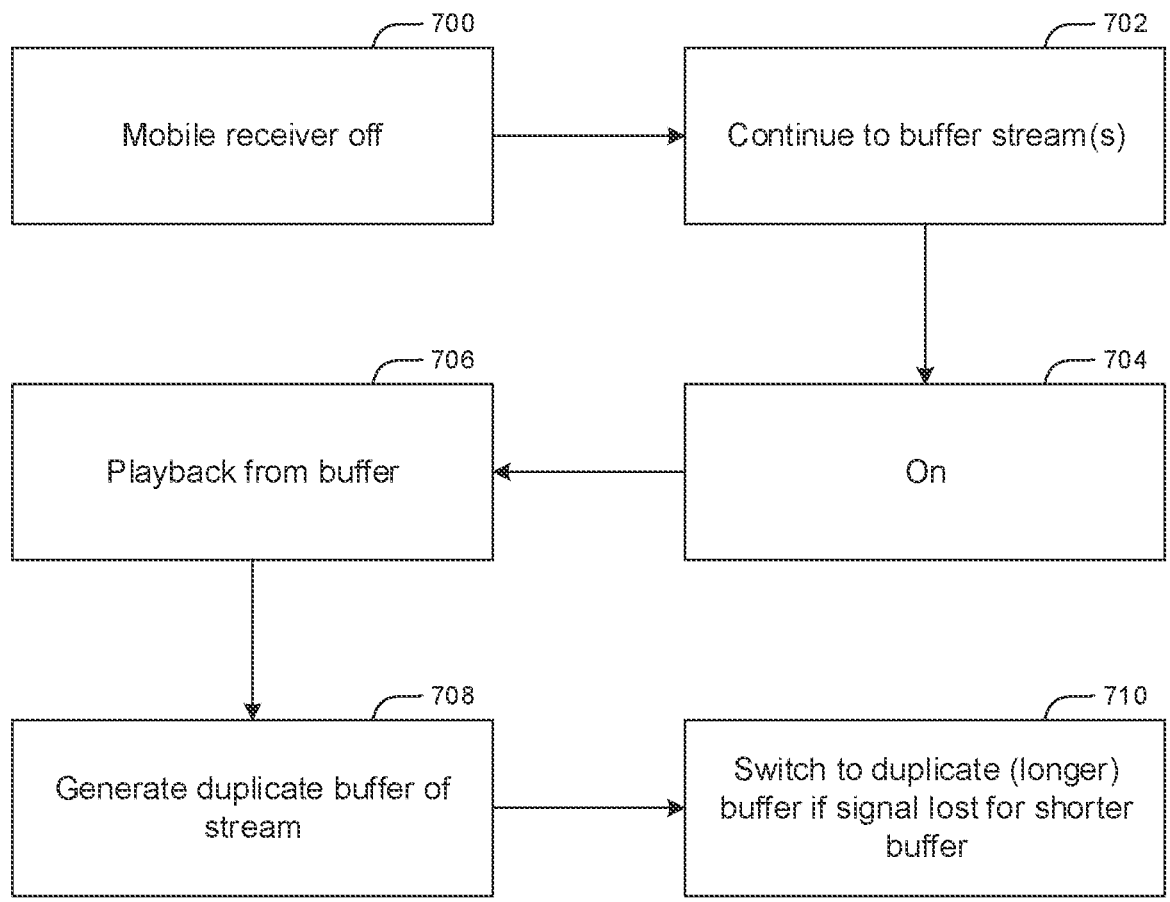
FIG. 7 illustrates example logic in example flow chart format for cold start of the mobile receiver.

FIG. 7 illustrates that when the mobile receiver 300 is turned off at block 700 in the sense that it is no longer in a presentation mode to present digital TV content, it can continue to receive content at block 702 in the buffer 306 for selected channels. When the receiver resumes presenting digital TV at block 704, the buffer 306 is full and playback can occur right away at block 706. Alternatively, upon "cold start" of the mobile receiver 300 to begin playing digital TV, a small buffer (of a few seconds for example) may be created at block 704 for the initial stream to begin play relatively quickly, while at the same time and in parallel a larger buffer for the stream may be created at block 708 that can be switched to in case of signal outage at block 710.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

It will be appreciated that whilst present principals have been described with reference to some example embodiments, these are not intended to be limiting, and that various alternative arrangements may be used to implement the subject matter claimed herein.

What is claimed is:

1. A method, comprising:
 receiving digital TV signals by at least one mobile receiver;
 receiving a first command at the mobile receiver;
 responsive to the first command, continuing to buffer at least one digital TV stream in the buffer;
 receiving a second command at the mobile receiver;
 responsive to the second command, identifying whether packets associated with a stream to be played are in the buffer;

responsive to determining that packets associated with the stream to be played are not in the buffer, beginning to buffer packets of the stream to be played;

playing the stream to be played from the buffer;

creating a duplicate buffer of the stream to be played; and selectively switching to playing packets in the duplicate buffer.

2. The method of claim 1, comprising sending replacement packets for defective or lost packets in the digital TV signals to the mobile receiver from a cellular telephony network.

3. The method of claim 1, comprising sending replacement packets for defective or lost packets in the digital TV signals to the mobile receiver from a Wi-Fi source.

4. The method of claim 1, wherein the digital TV signals comprise advanced television systems committee (ATSC) 3.0 signals.

5. A digital television (TV) system comprising:

at least one processor programmed with instructions to:

receive a first digital TV broadcast stream;

play the first stream;

receive a command to stop presenting digital TV;

responsive to the command to stop presenting, continue to buffer at least one digital TV stream in at least one buffer;

receive a command to commence playing digital TV;

responsive to the command to commence playing and responsive to packets associated with the stream to be played not being in the buffer, begin to buffer packets of the stream to be played;

play the stream to be played from the buffer;

create a duplicate buffer of the stream to be played; and selectively switch to playing packets in the duplicate buffer.

6. The digital TV system of claim 5, wherein the instructions are executable to:

identify at least one packet discrepancy in the first stream;

request, from at least one back channel source, data to cure the packet discrepancy;

receive the data from the back channel source;

use the data to correct the packet discrepancy.

7. The digital TV system of claim 5, wherein the back-channel source comprises at least one wireless telephony network.

8. The digital TV system of claim 5, wherein the back-channel source comprises at least one Wi-Fi source.

9. The digital TV system of claim 5, wherein the packet discrepancy comprises a missing packet or a damaged packet.

10. The digital TV system of claim 5, wherein the instructions are executable to:

simultaneously with buffering the first stream, buffer at least a second stream.

11. The digital TV system of claim 10, wherein the second stream is received in a multiplex containing the first stream.

12. The digital TV system of claim 10, wherein the first stream is received at a first tuner of the mobile receiver and the second stream is received at a second tuner of the mobile receiver.

13. The digital TV system of claim 5, wherein the instructions are executable to:

receive a channel change command to present a new channel;

responsive to the channel change command, determine whether packets associated with the new channel are in a buffer;

responsive to determining that packets associated with the new channel are in the buffer, immediately access the packets associated with the new channel from the buffer and present the new channel;

responsive to determining that packets associated with the new channel are not in the buffer, begin to buffer, for a second period shorter than the first period, packets of the new channel; and present the new channel.

14. The digital TV system of claim 13, wherein the instructions are executable to:

determine whether to add the new channel to a set of streams to be buffered for the first period; and responsive to identifying that the new channel should be added to the set of streams to be buffered for the first period, add the new channel to the set.

15. The digital TV system of claim 5, wherein the instructions are executable to:

identify at least one outage period associated with at least one route, the outage period being a period during which broadcast digital TV is not receivable; and establish the first period based at least in part on the outage period.

16. The digital TV system of claim 5, wherein the digital television system comprises at least one advanced television systems committee (ATSC) 3.0 system.

17. An assembly comprising:

at least one mobile receiver of digital television;

at least one processor associated with the mobile receiver and configured with instructions to:

receive a command to stop presenting digital TV on the mobile receiver;

after the command to stop presenting, continue to buffer at least one digital TV stream in at least one buffer;

receive a command to commence playing digital TV on the mobile receiver;

responsive to the command to commence playing and responsive to packets associated with the stream to be played not being in the buffer, buffer packets of the stream to be played;

play the stream to be played;

create a duplicate buffer of the stream to be played; and selectively switch to playing packets in the duplicate buffer.

18. The assembly of claim 17, wherein the mobile receiver is configured to receive content from at least one back-channel source that comprises at least one wireless telephony network.

19. The assembly of claim 17, wherein the mobile receiver is configured to receive content from at least one back-channel source that comprises at least one Wi-Fi source.

20. The assembly of claim 17, wherein the mobile receiver is configured to receive content from at least one digital over the air (OTA) source.

* * * * *